(12) United States Patent
Kawahata (10) Patent No.: US 8,963,989 B2
(45) Date of Patent: Feb. 24, 2015

(54) DATA DISTRIBUTION APPARATUS, DATA DISTRIBUTION METHOD, AND PROGRAM

(75) Inventor: Satoshi Kawahata, Kanagawa (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 13/699,682

(22) PCT Filed: Mar. 29, 2012

(86) PCT No.: PCT/JP2012/058378
§ 371 (c)(1),
(2), (4) Date: Nov. 23, 2012

(87) PCT Pub. No.: WO2012/141013
PCT Pub. Date: Oct. 18, 2012

(65) Prior Publication Data
US 2013/0063541 A1    Mar. 14, 2013

(30) Foreign Application Priority Data

Apr. 11, 2011   (JP) .................................. 2011-087232

(51) Int. Cl.
*H04N 7/15*     (2006.01)
*H04N 21/258*   (2011.01)

(52) U.S. Cl.
CPC .......... *H04N 21/25825* (2013.01); *H04N 7/15* (2013.01)
USPC ................... 348/14.08; 348/14.09; 348/14.12

(58) Field of Classification Search
CPC ..... H04N 21/25825; H04N 7/15; H04N 7/14; H04N 7/141; H04N 7/142; H04N 7/147; H04N 7/148; H04N 7/152

USPC ........................................... 348/14.01–14.16
See application file for complete search history.

(56) References Cited

U.S. PATENT DOCUMENTS

2004/0169683 A1    9/2004  Chiu et al.
2005/0243810 A1*  11/2005  Nose ............................ 370/356

FOREIGN PATENT DOCUMENTS

GB            2313251 A   *  11/1997
(Continued)

OTHER PUBLICATIONS

International Search Report issued Jun. 19, 2012, in International Application No. PCT/JP2012/058378.
(Continued)

*Primary Examiner* — Melur Ramakrishnaiah
(74) *Attorney, Agent, or Firm* — Sony Corporation (57) ABSTRACT

This technique relates to a data distribution apparatus, a data distribution method, and a program capable of selecting stream data required by a portable terminal from among multiple stream data, and distributing the stream data.
A receiving unit receives a first image generated by capturing an image, audio data generated by collecting sound, and second image data generated in advance before the first image is generated. An analyzing unit analyzes at least one of the audio data and the second image data. A generating unit generates distribution data including at least one of the first image and the second image in accordance with an analysis result provided by the analyzing unit. A distribution unit distributes the distribution data to a portable terminal as a stream. The present disclosure can be applied to, for example, a video conference apparatus.

7 Claims, 4 Drawing Sheets

(56) References Cited

FOREIGN PATENT DOCUMENTS

| | | |
|---|---|---|
| JP | 2003-32651 | 1/2003 |
| JP | 2004-110565 | 4/2004 |
| JP | 2004-266831 | 9/2004 |
| JP | 2009-232306 | 10/2009 |
| JP | 2010-154361 | 7/2010 |
| JP | 2010-198192 | 9/2010 |
| JP | 2010-246003 | 10/2010 |
| JP | 2010-534955 | 11/2010 |
| JP | 2011-142523 | 7/2011 |

OTHER PUBLICATIONS

Takeshi Tamura, et al., "Experiment with Voice-Control Operation Environment of Distance Learning", Proceedings of the 1990 IEICE General Conference Joho System 1, Mar. 8, 1999, p. 311 (with English translation).

Naoki Ohno, et al., "Video Stream Selection according to Lecture Context on Remote Lecture", Proceedings of the 1999 IEICE General Conference Joho System 1, Mar. 8, 1999, p. 310 (with English Translation).

* cited by examiner

DATA DISTRIBUTION APPARATUS, DATA DISTRIBUTION METHOD, AND PROGRAM

TECHNICAL FIELD

The present disclosure relates to a data distribution apparatus, a data distribution method, and a program. In particular, the present disclosure relates to, for example, a data distribution apparatus, a data distribution method, and a program for selecting stream data required by a portable terminal from among multiple stream data, and distributing the stream data.

BACKGROUND ART

There is a distribution technique for distributing images and audio as a stream (for example, see Patent Document 1). According to this distribution technique, when, for example, a presentation is given in a conference room, the presentation and documents and the like for the presentation are distributed using streaming, so that the presentation can be seen in other conference rooms.

More specifically, for example, when a presentation is held while seeing a document displayed on a display provided in a conference room, a first communication apparatus provided in a conference room captures an image in the conference room using a camera, and collects speeches spoken in the conference room using a microphone.

Then, the first communication apparatus uses streaming to distribute, as stream data, captured images obtained by capturing images, audio data obtained by collecting sounds, and document images representing documents for presentation displayed on the display to a second communication apparatus provided in another conference room.

The second communication apparatus displays the captured images and document images, which are sent from the first communication apparatus, on a display provided in another conference room in an overlapping manner by means of picture-in-picture and the like, and outputs audio data, which are sent from the first communication apparatus, by means of a speaker.

In this configuration, even in the another conference room provided with the second communication apparatus, the presentation can be seen.

CITATION LIST

Patent Document

Patent Document 1: Japanese Patent Application Laid-Open No. 2010-534955 (Japanese translation of PCT application)

SUMMARY OF THE INVENTION

Problems to be Solved by the Invention

With the above distribution technique, the presentation cannot be seen unless you are in one of the conference rooms.

Therefore, it is preferable to be able to see the presentation even at a location away from the office and the like, using a portable terminal such as a cellular phone.

However, the display of the portable terminal is much smaller than the display provided in the conference room. Therefore, when the captured images and document images, which are distributed from the first communication apparatus by streaming, are displayed on the display of the portable terminal, it is extremely difficult to see the captured images and document images.

For this reason, for example, a user of the portable terminal has to do, as necessary, switching operation for switching the image displayed on the display of the portable terminal to one of the captured image and the document image, which is extremely cumbersome.

In other words, for example, while the user sees the presentation, the user displays the document image required to understand the contents of the presentation. Moreover, for example, when the presentation is finished, and question-and-answer session and the like is held, the captured image required to understand the contents of the question-and-answer is displayed.

The present disclosure is made in view of the above circumstances, and the present disclosure is to select stream data required by the portable terminal and distribute the stream data.

Solutions to Problems

A data distribution apparatus according to an aspect of the present disclosure is a data distribution apparatus including a receiving unit for receiving a first image generated by capturing an image, audio data generated by collecting sound, and second image data generated in advance before the first image is generated, an analyzing unit for analyzing at least one of the audio data and the second image data, a generating unit for generating distribution data including at least one of the first image and the second image in accordance with an analysis result provided by the analyzing unit, and a distribution unit for distributing the distribution data to a portable terminal as a stream.

When first distribution data including the second image data are distributed as a stream, the generating unit can generate second distribution data including the first image data in response to acquisition of an analysis result indicating that the audio data representing sound with a volume which is less than a threshold value defined in advance has been received continuously.

When the second distribution data are distributed as a stream, the generating unit can generate the first distribution data in response to acquisition of an analysis result indicating that a content of an image representing the received second image data has been changed.

The receiving unit can receive the first image, the audio data, and the second image data in accordance with a first communication method, and the distribution unit can distribute, as a stream, the distribution data to the portable terminal in accordance with a second communication method which is different from the first communication method.

The generating unit can generate the distribution data including not only one of the first and second images but also the audio data.

The distribution unit can distribute the distribution data using one stream.

A data distribution method according to an aspect of the present disclosure is a data distribution method for a data distribution apparatus for distributing, as a stream, data to a portable terminal, the data distribution apparatus performing a receiving step for receiving a first image generated by capturing an image, audio data generated by collecting sound, and second image data generated in advance before the first image is generated, an analyzing step for analyzing at least one of the audio data and the second image data, a generating step for generating distribution data including at least one of the first image and the second image in accordance with an analysis result provided in the analyzing step, and a distribution step for distributing the distribution data to the portable terminal as a stream.

A program according to an aspect of the present disclosure is a program for causing a computer to function as a receiving control unit for receiving a first image generated by capturing an image, audio data generated by collecting sound, and second image data generated in advance before the first image is generated, an analyzing unit for analyzing at least one of the audio data and the second image data, a generating unit for generating distribution data including at least one of the first image and the second image in accordance with an analysis result provided by the analyzing unit, and a distribution unit for distributing the distribution data to a portable terminal as a stream.

According to an aspect of the present disclosure, a first image generated by capturing an image, audio data generated by collecting sound, and second image data generated in advance before the first image is generated are received, at least one of the audio data and the second image data are analyzed, distribution data including at least one of the first image and the second image are generated in accordance with an analysis result provided in the analyzing step, and the distribution data are distributed to the portable terminal as a stream.

Effects of the Invention

According to the present disclosure, stream data required by the portable terminal can be selected and distributed.

MODE FOR CARRYING OUT THE INVENTION

Hereinafter, a mode for carrying out the invention (hereinafter referred to as embodiment) will be explained. It should be noted that the explanation will be made in the following order.
1. The present embodiment (an example where stream data distributed to a mobile terminal are changed in accordance with the situation of video conference)
2. Modification
<1. The Present Embodiment>
[Configuration Example of Video Conference System 1]

Figure 1:
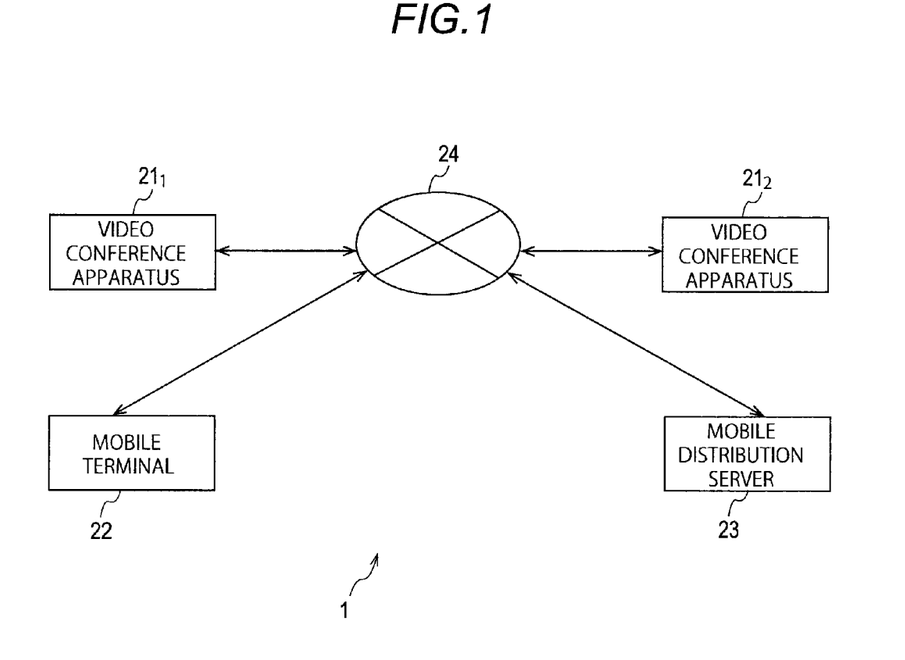
FIG. 1 is a block diagram illustrating a configuration example of a video conference system according to the present disclosure.

FIG. 1 illustrates a configuration example of a video conference system 1 which is the present embodiment.

This video conference system 1 includes a video conference apparatus $21_1$, a video conference apparatus $21_2$, a mobile terminal 22, and a mobile distribution server 23, each of which is connected via a network 24 such as the Internet.

In particular, in this video conference system 1, the mobile distribution server 23 selects stream data, which are to be distributed to the mobile terminal 22, from among multiple stream data communicated between the video conference apparatus $21_1$ and the video conference apparatus $21_2$, and distributes the stream data.

The video conference apparatuses $21_1$ and $21_2$ is used for video conference. More specifically, the video conference apparatuses $21_1$ and $21_2$ communicate multiple stream data with each other via the network 24 according to a first communication method using, for example, RTP (real-time transport protocol), with each of multiple stream data being treated as a different stream.

Multiple stream data communicated between the video conference apparatuses $21_1$ and $21_2$ are provided to the mobile distribution server 23 via the network 24 according to the first communication method.

More specifically, for example, the video conference apparatus $21_1$ collects audio spoken in a conference room and the like where the video conference apparatus $21_1$ itself is installed, and transmits audio data obtained as a result of collecting the audio to the video conference apparatus $21_2$ and the mobile distribution server 23.

On the other hand, for example, the video conference apparatus $21_1$ transmits document data, which represents documents used for presentation held in a conference room where the video conference apparatus $21_1$ itself is installed, to the video conference apparatus $21_2$ and the mobile distribution server 23. It should be noted that the document data are prepared in advance by a participant of a video conference who gives the presentation before the video conference is held.

Further, for example, the video conference apparatus $21_1$ captures images of the conference held in a conference room and the like where the video conference apparatus $21_1$ itself is installed, and transmits the captured image data representing the captured images obtained as a result of capturing the images to the video conference apparatus $21_2$ and the mobile distribution server 23.

The video conference apparatus $21_2$ receives the audio data, the document data, and the captured image data respectively transmitted from the video conference apparatus $21_1$ as separate streams. Then, for example, the video conference apparatus $21_2$ causes a speaker, not shown, to output audio corresponding to the received audio data. For example, the video conference apparatus $21_2$ overlays a captured image corresponding to the received captured image data onto a document image corresponding to the received document data, by means of picture-in-picture, and causes the captured image overlaid on the document image to be displayed on a display, not shown.

Further, for example, the video conference apparatus $21_2$ collects audio spoken in a conference room and the like where the video conference apparatus $21_2$ itself is installed, and transmits audio data obtained as a result of collecting the audio to the video conference apparatus $21_1$. In addition, for example, the video conference apparatus $21_2$ captures images of the conference held in a conference room and the like where the video conference apparatus $21_2$ itself is installed, and transmits the captured image data obtained as a result of capturing the images to the video conference apparatus $21_1$.

It should be noted that the video conference apparatus $21_1$ receives the captured image data from the video conference apparatus $21_2$. Then, the video conference apparatus $21_1$ overlays the captured image corresponding to the received captured image data onto the document image corresponding to the document data by means of picture-in-picture, and causes the captured image overlaid on the document image to be displayed on a display, not shown. In addition, the video conference apparatus $21_1$ receives audio data from the video conference apparatus $21_2$, and outputs audio corresponding to the received audio data to a speaker, not shown.

The mobile terminal 22 is a mobile terminal capable of communicating using a second communication method using, for example, HTTP (hypertext transfer protocol). The mobile terminal 22 transmits a distribution request of distribution data distributed according to the second communication method, constituted in a data format that can be viewed with a Web browser, to the mobile distribution server 23 via the network 24.

Then, upon the distribution request, the mobile terminal 22 receives distribution data distributed from the mobile distribution server 23 via the network 24 according to the second communication method.

In addition, the mobile terminal 22 outputs the received distribution data to a display and the like using, for example, a Web browser supporting HTML5.

Further, the mobile terminal 22 transmits a distribution stop request of distribution of distribution data to the mobile distribution server 23 via the network 24. Accordingly, the mobile distribution server 23 stops distribution of the distribution data.

The mobile distribution server 23 receives the audio data, the document data, and the captured image data provided from the video conference apparatus $21_1$ via the network 24 according to the first communication method.

In response to the distribution request given from the mobile terminal 22, the mobile distribution server 23 generates distribution data including the received audio data and one of the document data and the captured image data received, and provides the distribution data to the mobile terminal 22 via the network 24.

More specifically, for example, the mobile distribution server 23 generates the distribution data constituted by, e.g., the received audio data and one of the document data and the captured image data as well as control data required by distribution according to the second communication method, and provides the distribution data via the network 24 to the mobile terminal 22.

[Configuration Example of Mobile Distribution Server 23]

Figure 2:
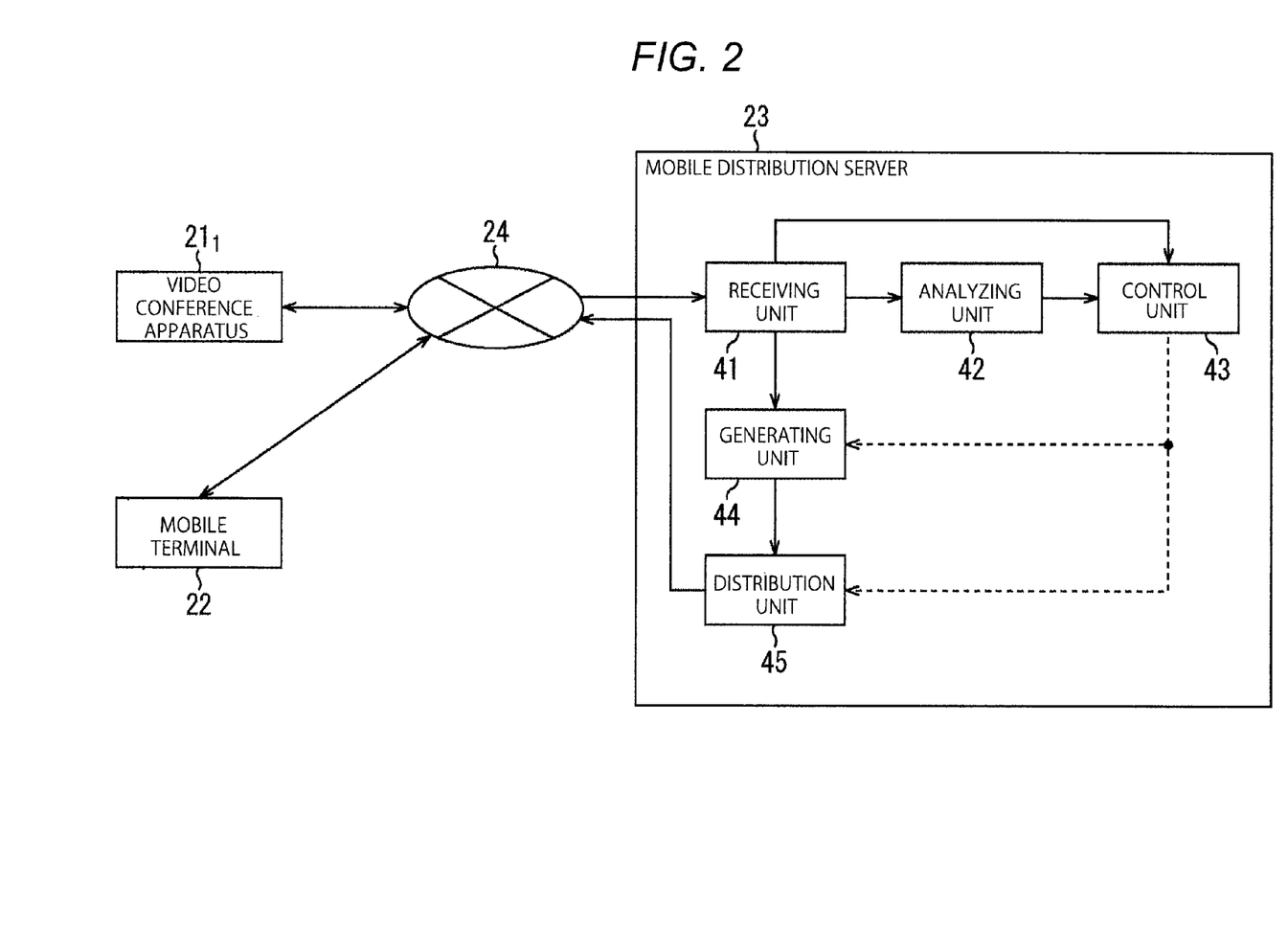
FIG. 2 is a block diagram illustrating a configuration example of a mobile distribution server.

Subsequently, FIG. 2 illustrates a configuration example of the mobile distribution server 23.

This mobile distribution server 23 includes a receiving unit 41, an analyzing unit 42, a control unit 43, a generating unit 44, and a distribution unit 45.

The receiving unit 41 provides a distribution request or a distribution stop request, which are provided from the mobile terminal 22 via the network 24, to the control unit 43.

The receiving unit 41 receives the audio data, the document data, and the captured image data, which are provided from the video conference apparatus $21_1$ via the network 24, as separate streams, and provides the audio data, the document data, and the captured image data to the analyzing unit 42 and the generating unit 44.

The analyzing unit 42 determines, on the basis of the audio data provided from the receiving unit 41, whether a silent state in which the volume is less than a predetermined threshold value continues for a predetermined period of time in a conference room in which the video conference apparatus $21_1$ is provided.

Then, when the analyzing unit 42 obtains an analysis result indicating that the silent state in which the volume is less than the predetermined threshold value continues for the predetermined period of time in the conference room in which the video conference apparatus $21_1$ is provided, the analyzing unit 42 notifies the control unit 43 to that effect.

In addition, the analyzing unit 42 performs analysis to determine whether the contents of the document distributed from the video conference apparatus $21_1$ have been changed or not, on the basis of the document data provided from the receiving unit 41.

Then, when the analyzing unit 42 obtains an analysis result indicating that the contents of the document distributed from the video conference apparatus $21_1$ have been changed, the analyzing unit 42 notifies the control unit 43 to that effect.

The control unit 43 controls the generating unit 44 and the distribution unit 45 in response to the distribution request or the distribution stop request provided from the receiving unit 41. In addition, for example, the control unit 43 controls the generating unit 44 and the distribution unit 45 in accordance with the notification content given by the analyzing unit 42.

According to the control of the control unit 43, the generating unit 44 generates distribution data including audio data given by the receiving unit 41 and one of the document data and the captured image data given by the receiving unit 41, and provides the distribution data to the distribution unit 45.

The distribution unit 45 distributes, as one stream, the distribution data which are given by the generating unit 44 to the mobile terminal 22 via the network 24 according to the second communication method.

It should be noted that the generating unit 44 may also generate distribution data including one of document data and captured image data given by the receiving unit 41 but not including the audio data given by the receiving unit 41, and may provide the distribution data to the distribution unit 45.

[Explanation About Operation of Mobile Distribution Server 23]

Figure 3:
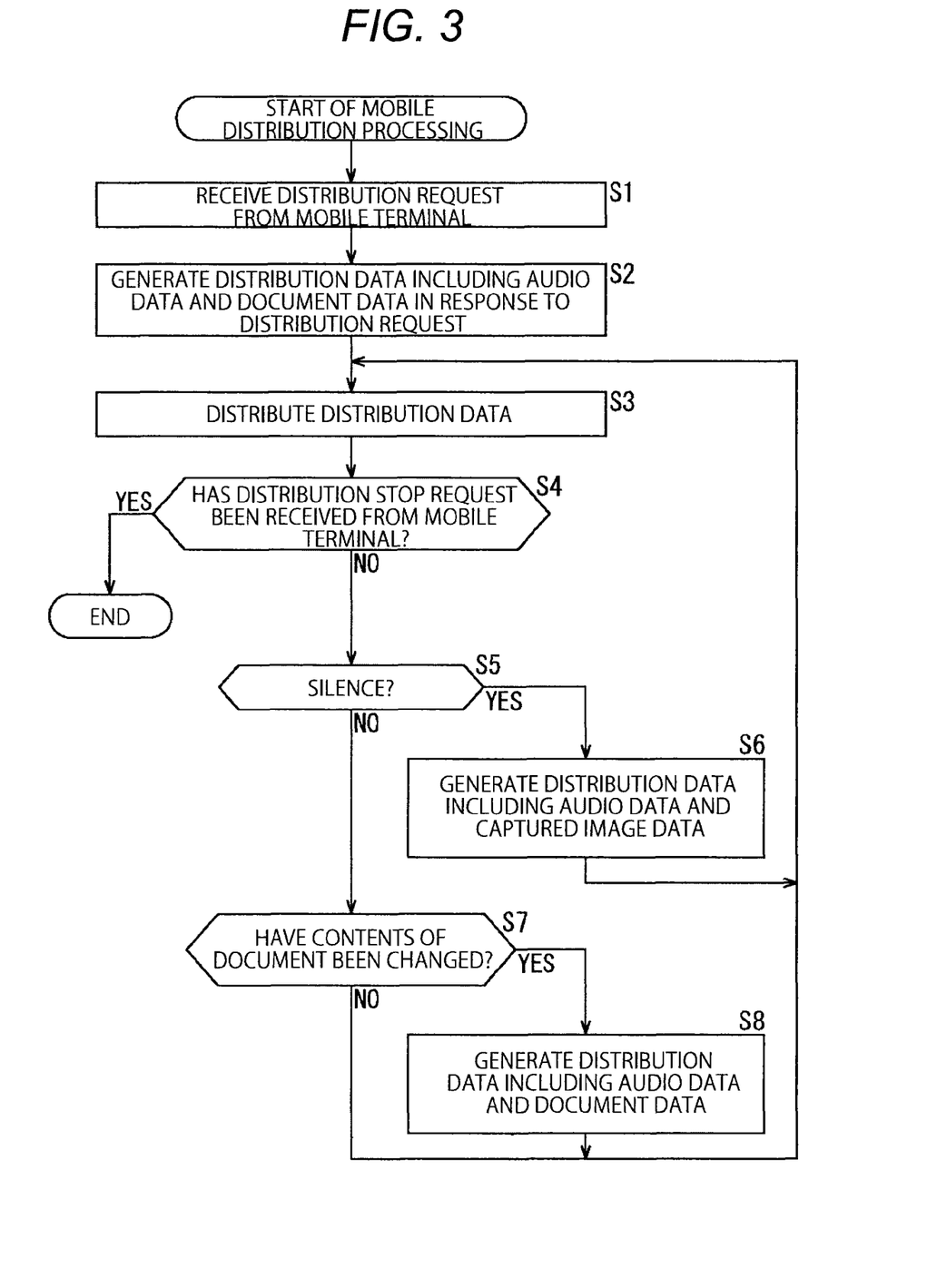
FIG. 3 is a flowchart for explaining mobile distribution processing.

Subsequently, mobile distribution processing performed by the mobile distribution server 23 will be explained with reference to a flowchart of FIG. 3.

In step S1, the receiving unit 41 receives the distribution request provided from the mobile terminal 22 via the network 24, and provides the distribution request to the control unit 43. The control unit 43 controls the generating unit 44 and the distribution unit 45 in accordance with the distribution request given by the receiving unit 41.

At this occasion, in step S2, according to the control of the control unit 43, the generating unit 44 generates distribution data including audio data and document data provided by the receiving unit 41, and provides the distribution data to the distribution unit 45.

In step S3, according to the control of the control unit 43, the distribution unit 45 provides, as one stream, the distribution data provided by the generating unit 44 to the mobile terminal 22 via the network 24.

Accordingly, on the basis of the distribution data provided by the distribution unit 45, the mobile terminal 22 outputs audio corresponding to the audio data, and displays a document image corresponding to the document data.

In step S4, the control unit 43 determines, on the basis of whether a distribution stop request is provided by the receiving unit 41 or not, whether the receiving unit 41 receives the distribution stop request from the mobile terminal 22. When the control unit 43 determines that the receiving unit 41 does not receive the distribution stop request, the processing in step S5 is subsequently performed.

In step S5, the analyzing unit 42 determines, on the basis of the audio data provided from the receiving unit 41, whether a silent state in which the volume is less than a predetermined threshold value continues for a predetermined period of time in the conference room in which the video conference apparatus $21_1$ is provided.

Then, when the analyzing unit 42 obtains an analysis result indicating that the silent state continues for the predetermined period of time, the analyzing unit 42 notifies the control unit 43 to that effect, and the processing in step S6 is subsequently performed.

When the control unit 43 is notified by the analyzing unit 42 that the analysis result indicating that the silent state continues for the predetermined period of time is obtained, for example, the control unit 43 determines that the presentation held in the conference room in which the video conference apparatus 21$_1$ is provided is terminated (temporarily interrupted).

After the presentation is finished, it is expected that, e.g., participants ask and answer questions. Therefore, it is desired that, instead of the presentation document, the captured images obtained by capturing the images in the conference room where the video conference apparatus 21$_1$ is provided is distributed to the mobile terminal 22, so that the situation in the conference room where the video conference apparatus 21$_1$ is provided is displayed.

Therefore, when the control unit 43 is notified by the analyzing unit 42 that the analysis result indicating that the silent state continues for the predetermined period of time is obtained, the control unit 43 controls the generating unit 44, and executes the processing of step S6 explained later. More specifically, in step S6, according to the control of the control unit 43, the generating unit 44 generates distribution data including audio data and captured image data provided by the receiving unit 41, and provides the distribution data to the distribution unit 45. Thereafter, the processing in step S3 is subsequently performed.

In step S3, the distribution unit 45 provides the distribution data provided by the generating unit 44 to the mobile terminal 22 via the network 24. Accordingly, on the basis of the distribution data provided by the distribution unit 45, the mobile terminal 22 outputs audio corresponding to the audio data, and displays captured image corresponding to the captured image data. After the processing in step S3 is finished, the processing in step S4 is subsequently performed. Thereafter, the same processing is repeated.

In step S5, when the analyzing unit 42 obtains an analysis result indicating that the silent state does not continue for the predetermined period of time or more in the conference room in which the video conference apparatus 21$_1$ is provided, the processing in step S7 is subsequently performed.

In step S7, the analyzing unit 42 performs analysis to determine whether the contents of the document distributed from the video conference apparatus 21$_1$ have been changed or not, on the basis of the document data provided from the receiving unit 41. Then, when the analyzing unit 42 obtains an analysis result indicating that the contents of the document distributed from the video conference apparatus 21$_1$ have been changed, the analyzing unit 42 notifies the control unit 43 to that effect, and the processing in step S8 is subsequently performed.

When the control unit 43 is notified by the analyzing unit 42 that the analysis result indicating that the contents of the document distributed from the video conference apparatus 21$_1$ is obtained, for example, the control unit 43 determines that the question-and-answer session held in the conference room in which the video conference apparatus 21$_1$ is provided is terminated, and the presentation is resumed.

In this case, the document used for the presentation is preferably distributed to the mobile terminal 22 and the document is displayed by the mobile terminal 22.

Accordingly, when the control unit 43 is notified by the analyzing unit 42 that the analysis result indicating that the contents of the document distributed from the video conference apparatus 21$_1$ is obtained, the control unit 43 controls the generating unit 44, whereby the processing in step S8 is executed. More specifically, in step S8, according to the control of the control unit 43, the generating unit 44 generates distribution data including audio data and document data provided by the receiving unit 41, and provides the distribution data to the distribution unit 45. Thereafter, the processing in step S3 is subsequently performed.

In step S3, the distribution unit 45 provides the distribution data provided by the generating unit 44 to the mobile terminal 22 via the network 24. Accordingly, on the basis of the distribution data provided by the distribution unit 45, the mobile terminal 22 outputs audio corresponding to the audio data, and displays a document image corresponding to the document data. After the processing in step S3 is finished, the processing in step S4 is subsequently performed. Thereafter, the same processing is repeated.

In step S4, when the control unit 43 determines, on the basis of whether a distribution stop request is provided by the receiving unit 41 or not, that the receiving unit 41 receives the distribution stop request, the control unit 43 terminates the mobile distribution processing.

As explained above, in the mobile distribution processing, the distribution unit 45 distributes, as a stream, one of the document data and the captured image data to the mobile terminal 22.

Therefore, on a display, not shown, on the mobile terminal 22, both of the document image and the captured image are displayed, and this can prevent difficulty in seeing the display of the mobile terminal 22.

In the mobile distribution processing, among the captured image data or the document data, image data of interest are distributed to the mobile terminal 22 in accordance with the situation of the video conference (presentation), and therefore, even though both of the captured image and the document image are not displayed, the user can understand the contents of the video conference without any difficulty, and can participate in the video conference.

<2. Modification>

In the present embodiment, the mobile distribution server 23 for generating the distribution stream and distributing the distribution stream to the mobile terminal 22 is provided. Alternatively, for example, the video conference apparatus 21$_2$ may be configured to function as the mobile distribution server 23.

It should be noted that this technique may be configured as follows.

(1) A data distribution apparatus according to an aspect of the present disclosure is a data distribution apparatus including a receiving unit for receiving a first image generated by capturing an image, audio data generated by collecting sound, and second image data generated in advance before the first image is generated, an analyzing unit for analyzing at least one of the audio data and the second image data, a generating unit for generating distribution data including at least one of the first image and the second image in accordance with an analysis result provided by the analyzing unit, and a distribution unit for distributing the distribution data to a portable terminal as a stream.

(2) The data distribution apparatus described in the above (1), wherein when first distribution data including the second image data are distributed as a stream, the generating unit generates second distribution data including the first image data in response to acquisition of an analysis result indicating that the audio data representing sound with a volume which is less than a threshold value defined in advance has been received continuously.

(3) The data distribution apparatus described in the above (1) or (2), wherein when the second distribution data are distributed as a stream, the generating unit generates the first distribution data in response to acquisition of an analysis result indicating that a content of an image representing the received second image data has been changed.

(4) The data distribution apparatus described in the above (1) to (3), wherein the receiving unit receives the first image, the audio data, and the second image data in accordance with a first communication method, and the distribution unit distributes, as a stream, the distribution data to the portable terminal in accordance with a second communication method which is different from the first communication method.

(5) The data distribution apparatus described in the above (1) to (4), wherein the generating unit generates the distribution data including not only one of the first and second images but also the audio data.

(6) The data distribution apparatus described in the above (1) to (5), wherein the distribution unit distributes the distribution data using one stream.

By the way, a series of processing explained above may be executed by hardware or may be executed by software. When the series of processing is executed by software, programs constituting the software are installed from a program recording medium to a computer incorporated into dedicated hardware or, e.g., a general-purpose computer capable of executing various kinds of functions when the various kinds of programs are installed to the computer.

[Configuration Example of Computer]

Figure 4:
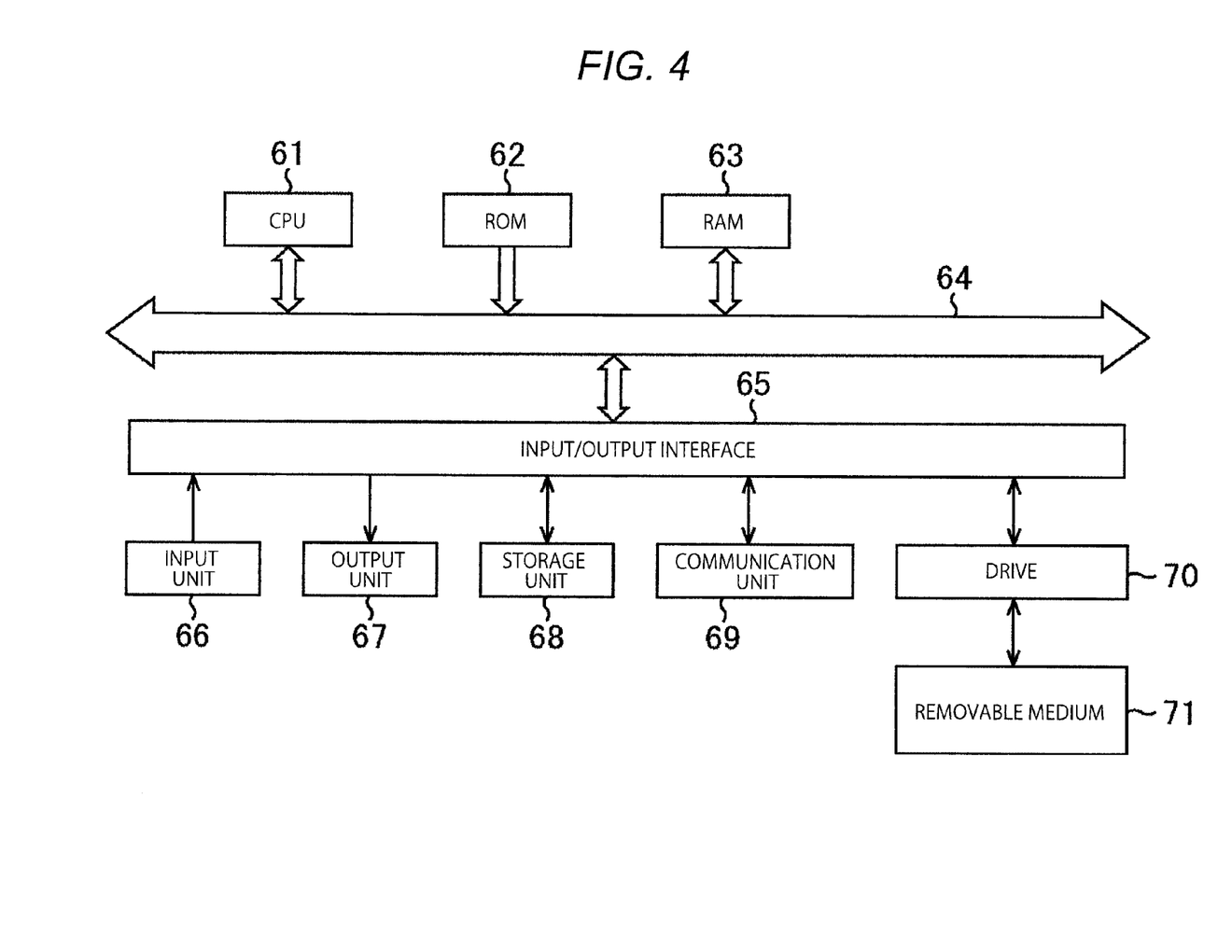
FIG. 4 is a block diagram illustrating a configuration example of a computer.

FIG. 4 is a block diagram illustrating a configuration example of hardware of a computer executing the above series of processing using programs.

A CPU (Central Processing Unit) 61 executes various kinds of processing in accordance with programs stored in a ROM (Read Only Memory) 62 or a storage unit 68. The RAM (Random Access Memory) 63 stores, as necessary, programs, data, and the like, which are executed by the CPU 61. The CPU 61, the ROM 62, and the RAM 63 are connected with each other via a bus 64.

The CPU 61 is connected to an input/output interface 65 via the bus 64. The input/output interface 65 is connected to an input unit 66 made of a keyboard, a mouse, a microphone, and the like, and an output unit 67 made of a display, a speaker, and the like. The CPU 61 executes various kinds of processing in response to commands which are input from the input unit 66. Then, the CPU 61 outputs results of processing to the output unit 67.

The storage unit 68 connected to the input/output interface 65 is made of, for example, a hard disk, and stores various kinds of data and programs executed by the CPU 61. The communication unit 69 communicates with an external apparatus via a network such as the Internet and a local area network.

Programs may be obtained via the communication unit 69, and may be stored to the storage unit 68.

When a removable medium 71 such as a magnetic disk, an optical disk, a magneto-optical disk, or a semiconductor memory is attached, a drive 70 connected to the input/output interface 65 drives them, and obtains programs, data, and the like recorded therein. The programs and data thus obtained are transferred to the storage unit 68 as necessary, and are stored therein.

As shown in FIG. 4, a recording medium recording (storing) programs installed to a computer and caused to be an executable state by the computer is constituted by a removable medium 71 which is a package medium made of a magnetic disk (including a flexible disk, an optical disk (including CD-ROM (Compact Disc-Read Only Memory), a DVD (Digital Versatile Disc), a magneto-optical disk (including MD (Mini-Disc)), or a semiconductor memory, or a ROM 62 temporarily or permanently storing programs, or a hard disk constituting the storage unit 68. As necessary, the programs are recorded to the recording medium by using wired or wireless communication medium such as a local area network, the Internet, and digital satellite broadcasting, via the communication unit 69 which is an interface such as a router or a modem.

In this specification, steps describing the above series of processing include processing performed in time sequence according to the described order. The steps may not be necessarily performed in time sequence, and the steps include processing executed in parallel or individually.

In this specification, the system includes the entire apparatus constituted by a plurality of apparatuses.

The embodiment of this invention is not limited to the present embodiment explained above, and can be changed in various manners without deviating from the gist of the present invention.

Reference Signs List 1 video conference system, $21_1$, $21_2$ video conference apparatus, 22 mobile terminal, 23 mobile distribution server, 24 network, 41 receiving unit, 42 analyzing unit, 43 control unit, 44 generating unit, 45 distribution unit

The invention claimed is:

1. A data distribution apparatus comprising:
a receiving unit for receiving a first image generated by capturing an image, audio data generated by collecting sound, and second image data generated in advance before the first image is generated;
an analyzing unit for analyzing at least one of the audio data and the second image data;
a generating unit for generating distribution data including at least one of the first image and the second image data in accordance with an analysis result provided by the analyzing unit; and
a distribution unit for distributing the distribution data to a portable terminal as a stream, wherein when first distribution data including the second image data is distributed as the stream, the generating unit generates second distribution data including the first image in response to acquisition of an analysis result indicating that the audio data representing sound with a volume which is less than a threshold value defined in advance has been received continuously.

2. The data distribution apparatus according to claim 1, wherein when the second distribution data is distributed as the stream, the generating unit generates the first distribution data in response to acquisition of an analysis result indicating that a content of an image representing the received second image data has been changed.

3. The data distribution apparatus according to claim 1, wherein the receiving unit receives the first image, the audio data, and the second image data in accordance with a first communication method, and the distribution unit distributes, as the stream, the distribution data to the portable terminal in accordance with a second communication method which is different from the first communication method.

4. The data distribution apparatus according to claim 1, wherein the generating unit generates the distribution data including not only one of the first image and second image data but also the audio data.

5. The data distribution apparatus according to claim 4, wherein the distribution unit distributes the distribution data using one stream.

6. A data distribution method for a data distribution apparatus for distributing, as a stream, data to a portable terminal, the data distribution method comprising:

receiving a first image generated by capturing an image, audio data generated by collecting sound, and second image data generated in advance before the first image is generated;

analyzing at least one of the audio data and the second image data;

generating distribution data including one of the first image and the second image data in accordance with an analysis result; and distributing the distribution data to the portable terminal as the stream.

7. A non-transitory computer-readable medium, having stored thereon, a computer program having at least one code section executable by a computer, thereby causing the computer to perform the steps comprising:

receiving a first image generated by capturing an image, audio data generated by collecting sound, and second image data generated in advance before the first image is generated;

analyzing at least one of the audio data and the second image data;

generating distribution data including one of the first image and the second image data in accordance with an analysis result; and distributing the distribution data to a portable terminal as the stream.

* * * * *